United States Patent
Johansson et al.

(10) Patent No.: US 8,402,919 B2
(45) Date of Patent: Mar. 26, 2013

(54) ARRANGEMENT FOR HOUSING MILKING ANIMALS

(75) Inventors: Björn Johansson, Södertälje (SE); Gösta Forssén, Tullinge (SE)

(73) Assignee: DeLaval Holding AB, Tumba (SE)

( * ) Notice: Subject to any disclaimer, the term of this patent is extended or adjusted under 35 U.S.C. 154(b) by 1395 days.

(21) Appl. No.: 10/542,294

(22) PCT Filed: Jan. 30, 2004

(86) PCT No.: PCT/SE2004/000122
§ 371 (c)(1),
(2), (4) Date: Apr. 21, 2006

(87) PCT Pub. No.: WO2004/068940
PCT Pub. Date: Aug. 19, 2004

(65) Prior Publication Data
US 2006/0249083 A1 Nov. 9, 2006

(30) Foreign Application Priority Data
Feb. 4, 2003 (SE) ...................................... 0300275

(51) Int. Cl.
*A01J 3/00* (2006.01)
*A01J 5/00* (2006.01)
(52) U.S. Cl. .................................................. 119/14.03
(58) Field of Classification Search ................. 119/14.1, 119/14.03, 14.04, 522, 523
See application file for complete search history.

(56) References Cited

U.S. PATENT DOCUMENTS
3,261,324 A * 7/1966 Conover ....................... 119/449

FOREIGN PATENT DOCUMENTS
| DE | 87 02 216.8 | | 4/1987 |
| DE | 37 02 465 A1 | | 8/1988 |
| DE | 195 21 570 A1 | | 1/1997 |
| DE | 101 31 443 A1 | | 1/2003 |
| EP | 0566201 A2 | | 10/1993 |
| EP | 0566201 A2 | * | 10/1993 |

(Continued)

OTHER PUBLICATIONS

Summons to attend oral proceedings dated Mar. 14, 2011 issued in corresponding European Application No. 04706911.7 and annex thereto.

(Continued)

*Primary Examiner* — Monica Williams
(74) *Attorney, Agent, or Firm* — Young & Thompson (57) ABSTRACT

An arrangement for housing a large number of milking animals, each of which belongs to one of a plurality of groups, comprises a resting area (1) wherein the milking animals are allowed to rest; a feeding area (3) wherein the milking animals are fed; and a milking area (5) housing at least one milking robot for milking the milking animals, wherein the resting area (1) or the feeding area (3) is partitioned in sections (7, 9, 11, 13; 41, 43, 45, 47), the number of which corresponds to the number of the groups; and a device (19; 53) is provided for directing each of the milking animals moving towards the resting area (1) or the feeding area (3), which is partitioned in sections, into one of the sections depending on the group, to which the respective milking animal belongs, so that that each of said sections will house milking animals belonging to one of said groups.

18 Claims, 3 Drawing Sheets

FOREIGN PATENT DOCUMENTS

| | | | |
|---|---|---|---|
| EP | 0608941 | A1 | 8/1994 |
| EP | 0608941 | A1 * | 8/1994 |
| EP | 0 753 249 | A1 | 1/1997 |
| EP | 0832558 | A2 * | 4/1998 |
| EP | 0832558 | A2 | 4/1998 |
| EP | 0 898 883 | A2 | 3/1999 |
| EP | 0898880 | A1 | 3/1999 |
| EP | 0898880 | A1 * | 3/1999 |
| EP | 1213676 | A1 * | 6/2002 |
| NL | 1000474 | | 12/1996 |
| NL | 1012445 | | 12/2000 |
| WO | WO 96/03031 | | 2/1996 |
| WO | WO 98/00006 | | 1/1998 |
| WO | WO 99/25176 | | 5/1999 |
| WO | WO 99/41977 | | 8/1999 |
| WO | WO 99/63808 | | 12/1999 |
| WO | WO 00/01226 | | 1/2000 |
| WO | WO 00/22919 | | 4/2000 |
| WO | WO 01/17339 | | 3/2001 |
| WO | WO 01/93666 | | 12/2001 |

OTHER PUBLICATIONS (D6) Luther Henning, "Analyse der Inbetriebnahme eines automatischen Melksystems", Kiel (Jul. 2000).

(D7) Letter dated Sep. 25, 2008 from Christian-Albrechts-Universitat zu Kiel, to WestfaliaSurge GmbH.

(D10) "Das Management ist noch wichtiger als beim Melkstand", *Melkroboter*, Top Agrar pp. R16-R21 (Feb. 1999).

(D11) "Melkroboter: Rechnet sich die neue Technik?",*Melktechnik*, pp. R6-R9 (Mar. 1997).

(D12) Anders Thylen, "Teknik Lantbruket—automatisk Mjolkning", No. 64 (1998).

(D13) Anders Thylen, "Teknik Lantbruket—automatic milking", Issue 64 (1998).

(D29) pp. 3-14 of a wrongly filed document.

(D30) Stable design Beenackers, 1997 (includes: (D30-1) Sales contract, Aug. 12, 1997 (D30-2) Service contract, Feb. 28, 2002 (D30-3) Declaration, Nov. 23, 2007 (D30-4) Printout from Lely website, 2001 (D30-5, 5A) Detail from website.

(D31) Stable Lathouwers, Boerdonk 2000 (includes: (D31-1) Sales contract, Jun. 5, 2000 (D31-2A, 2B) Packing list, Nov. 2000 (D31-3) Service Contract, Apr. 17, 2002 (D31-4) Drawing of barn design.

(D32) O. Lind et al., "Automatic Milking", *Bull. Of the Int'l Dairy Fed.*, IDF, Bruxelles, Belgium, No. 348, pp. 3-14 (2000).

\* cited by examiner

ARRANGEMENT FOR HOUSING MILKING ANIMALS

TECHNICAL FIELD OF THE INVENTION

The present invention relates generally to dairy farming, and more specifically to a computer-controlled arrangement for housing a large number of milking animals.

DESCRIPTION OF RELATED ART AND BACKGROUND OF THE INVENTION

An animal arrangement for housing large stocks of milking animals, e.g. hundreds or even thousands of milking animals, may comprise a resting area wherein the milking animals are allowed to rest, a feeding area wherein the milking animals are fed, and a milking area housing a plurality of milking robots for milking the milking animals.

Typically, very large stocks of milking animals are milked semi-automatically at predetermined periods of times. However, when managing large stocks of milking animals fully automatically, a few problems arise.

One problem encountered in automatic animal arrangements housing large stocks of milking animals is that it is more difficult to monitor and control the milking animals. Typically, the arrangement is partitioned in different sections housing different animals, but nevertheless it is more difficult to find a particular milking animal, which for example has to be treated manually by the farmer.

Another problem encountered is the difficulties in obtaining high milking machine utilization. This problem is particularly noticeable in very large arrangements partitioned in different sections, and which have a large number of milking robots for milking.

SUMMARY OF THE INVENTION

A general object of the present invention is thus to provide a computer-controlled arrangement for housing a large number of milking animals, but which, nevertheless, is flexible and can maintain a good overall control of the milking animals.

A particular object of the invention is to provide a computer-controlled arrangement for housing a large number of milking animals, each of which belongs to one of a plurality of groups, wherein the arrangement includes a resting area wherein the milking animals are allowed to rest, a feeding area wherein the milking animals are fed, and a milking area housing at least one milking robot for milking the milking animals, and has capabilities for ease access to animals belonging to a particular group in order to e.g. inspect or treat at least some of the animals in the group.

It is still a further object of the invention to provide such an arrangement, which provides for high milking robot utilization.

It is still a further object of the invention to provide such an arrangement, which is flexible, reliable, of fairly low cost, and relatively easy to implement.

These objects, among others, are according to the present invention attained by arrangements as specified in the appended patent claims.

By the provision of an arrangement, wherein at least one of the resting area and the feeding area is partitioned in sections, the number of which corresponds to the number of the groups, to which the milking animals belong, and a device is provided for directing each of the milking animals moving towards the at least one of the resting area and the feeding area, which is partitioned in sections, into one of the sections depending on the group, to which the respective milking animal belongs, so that each of the sections will house milking animals belonging to one of the groups, visitation of only one section is needed for e.g. inspection or treatment of milking animals belonging to a particular group.

Preferably, milking animals having similar milk production, milking animals being in similar phases of the lactation cycle, milking animals on heat, gestation milking animals, or ill or infected milking animals belong to a single one of the plurality of groups.

Still preferably, the arrangement is designed so that a typical animal traffic is obtained according to which milking animals move from the resting area to the milking area, from the milking area to the feeding area, and from the feeding area back to the resting area.

The milking area with the plurality of milking robots may be designed for voluntary milking of the milking animals, i.e. animals that present themselves in the milking area may be permitted to be milked if they fulfill some kind of milking decision criteria. In such voluntary milking the milking robots are typically performing milking operations more or less continuously—also during nighttime. However, sometimes some milking animals will not visit the milking area for a too long period of time. To remedy such a problem the resting area may comprise at least one driving mechanism, particularly a movable fence, partition, wire or live wire, for driving milking animals in the resting area towards the milking area and the plurality of milking robots. Alternatively, or as a complement, different enticing techniques, e.g. use of different smells, sounds or visible phenomena such as light flashes, may be provided to entice the animals to visit the milking area to be milked.

In particular, the milking robots are typically utilized more rarely during nighttime. Thus, if not the complete action is performed automatically, the arrangement may in the evening notify a farmer of the cows which ought to be milked during the night, and in which section these cows are (if being in the resting area 1). The farmer may in turn manually collect these cows and bring them to the milking area 5. Such procedure may reduce the amount of night work for the farmer.

In one embodiment the resting area is partitioned in sections and in another embodiment the feeding area is partitioned in sections.

The device for directing typically includes at least one milking animal identification device and at least one computer-controlled gate opening device, both connected to and controlled by a central computer of the arrangement.

According to a further aspect of the invention an arrangement is provided, wherein a resting area is partitioned in sections, each of which being adapted to house milking animals belonging to one of a plurality of groups, and each of which being linked to a milking area with a plurality of milking boxes, each of which is adapted for milking of a respective milking animal present in the milking box, so that milking animals housed in the respective section have access to a subset only of the plurality of milking boxes; and a device is provided for automatically enlarging or reducing each of the subsets of the plurality of milking boxes, to which milking animals housed in the respective section have access, depending on the number of milking animals housed in the respective section or on the milking capacity required by the milking animals housed in the respective section. Preferably, the device for automatically enlarging or reducing each of the subsets of the plurality of milking boxes comprises at least one computer-controlled movable partition device, e.g. a movable fence, partition, wire or live wire.

By such provisions an arrangement is obtained, wherein the milking capacity can be dynamically changed to fit the needs in each section at each instant.

Similarly, the arrangement may be provided with a computer-controlled movable partition device for dynamically enlarging or reducing each of the sections of the resting area.

Further, a feeding area may be provided partitioned in sections and with a computer-controlled movable partition device for dynamically enlarging or reducing each of the sections of the feeding area.

The arrangements of the present invention are particularly well suited to house a very large number of milking animals such as e.g. at least about 200 milking animals, but they are applicable also to smaller numbers of animals, such as e.g. from 50-100 or 100-200.

Further characteristics of the invention, and advantages thereof, will be evident from the following detailed description of preferred embodiments of the present invention given hereinafter and the accompanying FIGS. 1-3, which are given by way of illustration only, and thus are not limitative of the present invention.

DETAILED DESCRIPTION OF EMBODIMENTS

In the following detailed description the milk-producing animals are cows. However, the invention is not limited to cows, but is applicable to any animals having the capability to produce large quantities of milk, such as sheep, goats, buffaloes, horses, etc.

Figure 1:
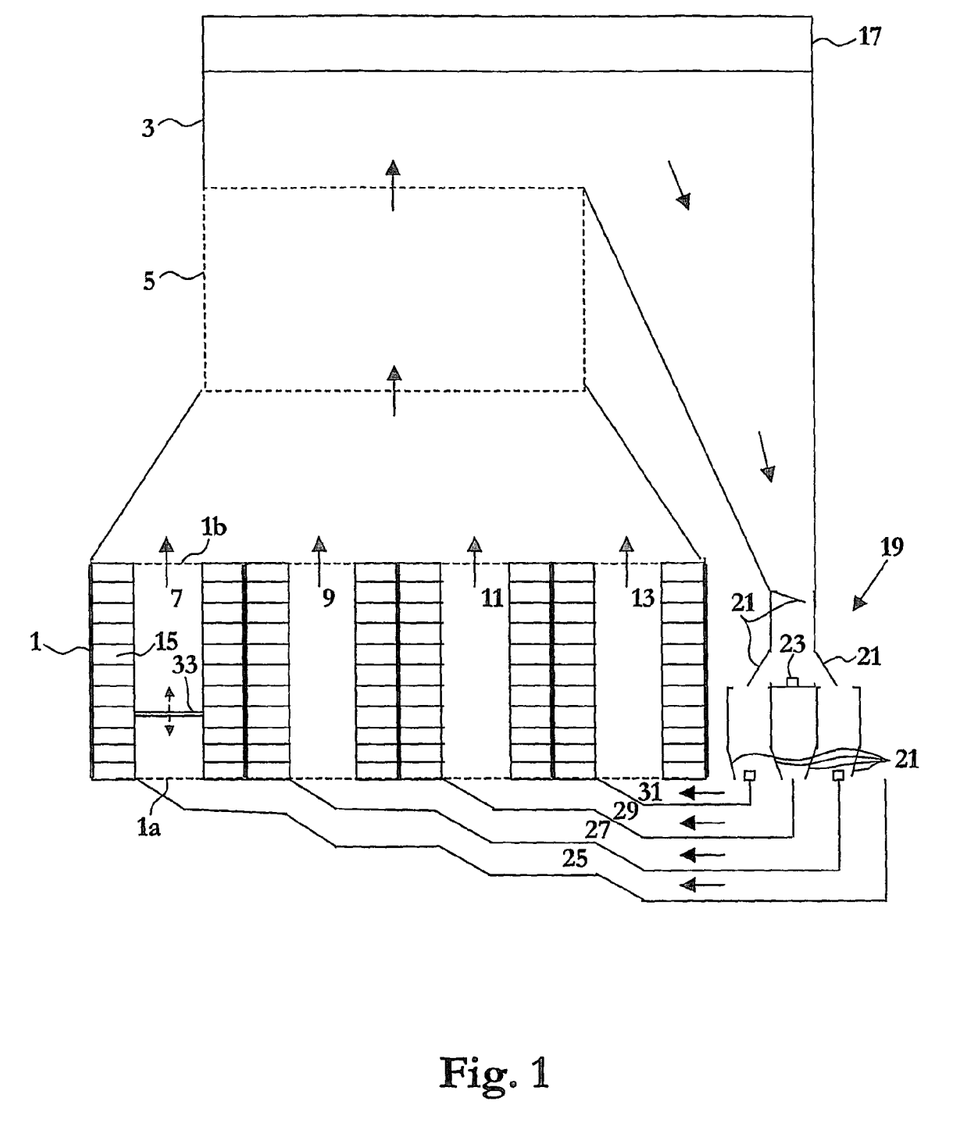
FIGS. 1-3 illustrate schematically, in top views, arrangements for housing a large number of milking animals according to three different preferred embodiments of the present invention.

FIG. 1 illustrates a computer-controlled animal arrangement for housing a large number of cows, preferably at least about 200, each of which belongs to one of four different groups. The arrangement may be arranged outside, but is preferably arranged indoors e.g. in a stable. The arrangement comprises a resting area 1, a feeding area 3, and a milking area 5, each defined by walls or other enclosure means.

The resting area 1 is partitioned in four sections 7, 9, 11, 12, each of which being separated from the others and each of which comprising two parallel rows of resting stalls 15 separated by an open floor. Each of the sections 7, 9, 11, 13 has an entrance in a back end 1*a* of the resting area 1, and an exit in a front end 1*b* thereof. The feeding area 3 comprises a feed table 17 for supplying different type of feed including ensilage, concentrate, roughage and minerals to the cows, which may be allowed to move about freely in the feeding area 3. The milking area 5 comprises at least one milking robot and at least one cow identification member to identify a cow entering the milking area 5 (not explicitly illustrated in FIG. 1).

Preferably, however, the milking area 5 houses a plurality of milking boxes, each of which being adapted to receive a respective cow, wherein the milking robot is adapted to milk cows present in the milking boxes concurrently. Still alternatively, the milking area 5 houses a plurality of milking robots for milking the cows therein. Each milking robot may take care of milking of a cow present in one or several milking boxes concurrently.

The enclosed areas 1, 3 and 5 are preferably arranged so that the cows have to move from the resting area 1 to the milking area 5, from the milking area 5 to the feeding area 3, and finally from the feeding area 3 back to the resting area 1 as being indicated by the arrows in FIG. 1. However, this is not a prerequisite for the present invention.

The animal arrangement may be provided with a number of one-way doors or gates, optionally provided with cow identification members, to control the traffic of cows. Such doors and gates may particularly be provided at the entrances and exits of the sections 7, 9, 11, 13 of the resting area 1, and at the entrance and exit of the milking area 5. Some of these doors, which are provided with cow identification members, can be two-way doors to allow a particular cow to walk in an opposite direction after having been identified.

The four different groups, to which each one of the large number of cows belongs may be defined in different manners. For instance, a first group may comprise cows having high milk production, a second group may comprise cows being in early phase of the lactation cycle, a third group may comprise cows on heat, and a forth group may comprise gestation cows. Alternatively, one group comprises cows, which are ill or have an infection. Naturally, the animal arrangement comprises means for automatically or manually altering the belonging from one to another one of the plurality of groups for each of the cows.

According to the inventive embodiment of FIG. 1 there is provided an intelligent gate arrangement 19 for directing each of the cows leaving the feeding area 3 and moving towards the resting area 1 into one of the sections 7, 9, 11, 13 depending on the group, to which the respective cow belongs, so that each of the sections 7, 9, 11, 13 will house cows belonging to one of the groups. In the example given above the section 7 may house the first group, i.e. the cows having high milk production, the section 9 may house the second group (cows being in early phase of the lactation cycle), the section 11 may house the third group (cows on heat), and the section 13 may house the forth group (gestation cows).

There may be many reasons for dividing up the cows in different sections depending on e.g. physical properties of the cows. For instance, ill cows can be treated together within a single section. Further, these cows can be hindered from leaving the resting area 1 for the milking area 5. The ill cows may be separated from other cows and be led to and milked in the milking area 5 only when no other cows are present. The milk is separated from the milk from healthy cows and the milking system is washed or disinfected once after the milking of the group of ill cows has been completed. This may be particularly advantageous if also the feeding area 3 is partitioned in corresponding sections. In such case the ill cows can be held separated from other cows permanently. This flow of ill cows can be made completely automatically by means of selection gates or can be regulated manually or semi-automatically.

The intelligent gate arrangement 19 comprises a number of one-way doors or gates 21 provided with computer-controlled door or gate opening devices, and at least one cow identification member 23. A cow entering through the first door or gate 21 is identified by the cow identification member 23 and after having been identified the other doors or gates 21 are closed or opened to direct the cow to the correct section. As being illustrated in FIG. 1, a separate passage way 25, 27, 29, 31 is provided for each section 7, 9, 11, 13 of the feeding area 1 from the intelligent gate arrangement 19.

It shall be appreciated that while FIG. 1 gives an example of passage ways from the feeding area 3 to the resting area 1, the present invention is not limited to such case. The design of the animal arrangement and its passage ways may be performed in a number of ways—some more complex than others. For instance, passage ways from the feeding area 3 to the resting area 1 may be arranged in at least two floors to effectively use available space and to provide for short passage ways.

It shall further be appreciated that the animal arrangement may comprise a movable partition device, e.g. a movable gate or fence, for altering the partitions in sections of the resting area 1 (not illustrated in FIG. 1).

In another version of the FIG. 1 embodiment, each of the sections 7, 9, 11, 13 is linked to the milking area 5 so that the cows housed in the respective section have access to a subset only of the plurality of milking robots in the milking area 5. In such a case a movable fence or gate device for enlarging or reducing each of the respective subsets of the plurality of milking robots depending e.g. on the milking capacity required by the cows housed in the respective section. More about these features will be discussed below with reference to FIG. 3.

While the milking arrangement is primarily intended to be used with a voluntary milking system, there may occur a need to entice or force cows to visit the milking area 5 and its plurality of milking robots. For this reason a driving mechanism, particularly a movable fence, partition, wire, live wire, or gate 33 is optionally provided for driving cows in the resting area 1 towards the milking area 5. The movable gate 33 is initially located in the back end 1a of the section 7. Since the entrance to the section 7 is located at the same position the movable gate 33 may be raised to allow the cows to pass by. Then, at a given instant the movable gate 33 starts to slowly move towards the front end 1b of the resting area. While moving the movable gate 33 other enticing means may be used to get the cows out from the resting stalls 15 so they can be forced to move towards the milking area 5. The horizontal movement of the movable gate 33 is in FIG. 1 indicated by the two-way dashed arrow.

Alternatively, or as a complement, different enticing techniques, e.g. use of different smells, sounds or visible phenomena such as light flashes, may be provided to entice the cows to visit the milking area to be milked. These enticing techniques are typically provided at particular locations such as in the resting stalls 15. If a resting stall is provided with a cow identification member such enticing may be performed for a particular cow, e.g. a cow which needs to be milked urgently, after having been identified.

Still alternatively, each cow may be provided with a receiver and a loudspeaker, and may be enticed, e.g. by means of playing a sound, to visit the milking area 5 independent of where she is at a given instant.

Such enticing techniques may also be performed in the milking area 5 to entice cows, which do not leave the milking area 5, to leave the milking area 5 after having been milked or if they have no permission to be milked.

Figure 2:
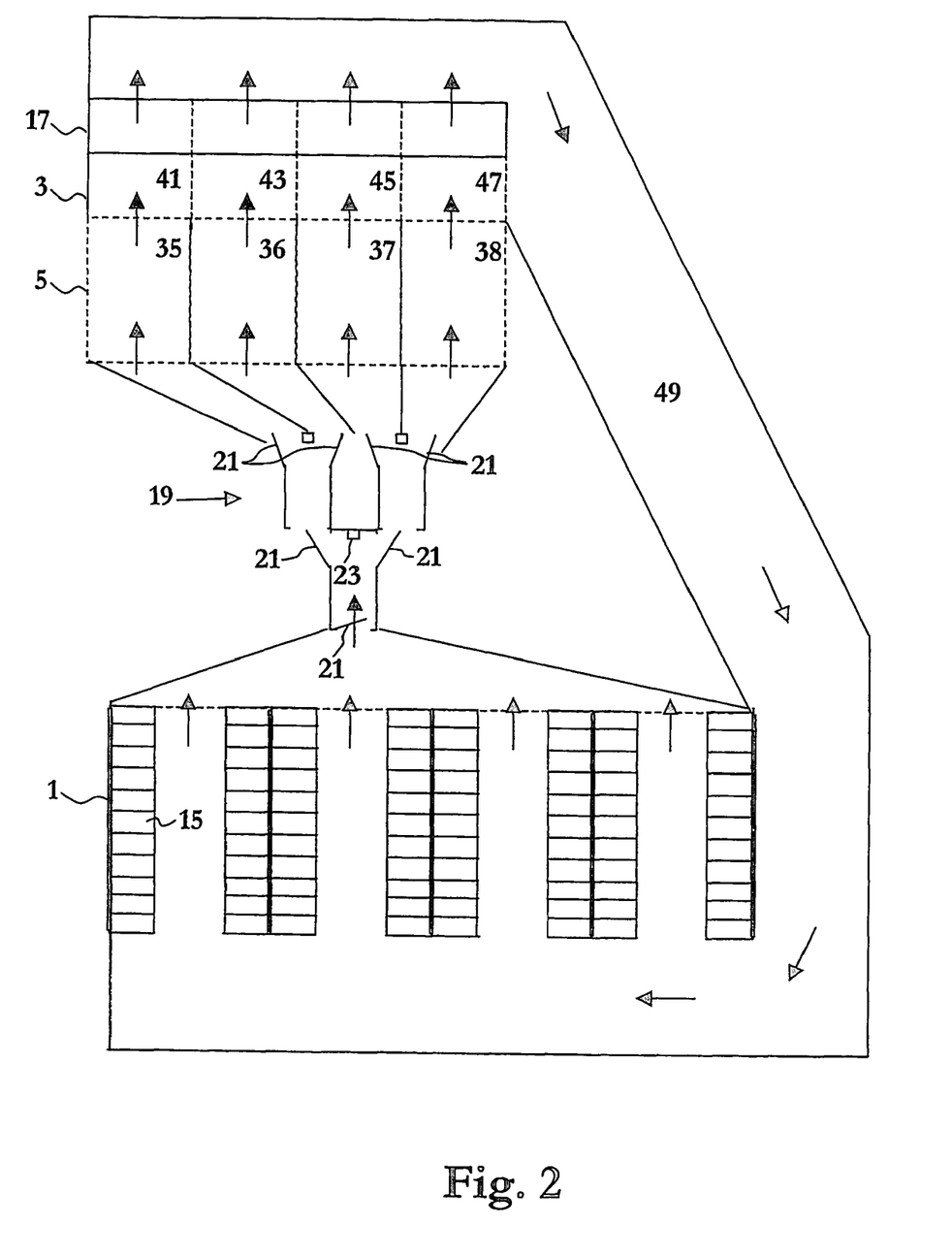

FIG. 2 illustrates a computer-controlled animal arrangement according to a further preferred embodiment of the invention. Here, the milking area 5 is partitioned in four sections 35, 36, 37, 38 and the feeding area 3 is partitioned in four sections 41, 43, 45, 47, whereas the resting area is not partitioned: the cows may walk about freely therein. The enclosed areas 1, 3 and 5 are arranged as in FIG. 1, i.e. so that the cows have to move from the resting area 1 to the milking area 5, from the milking area 5 to the feeding area 3, and finally from the feeding area 3 back to the resting area 1 as being indicated by the arrows in FIG. 2.

The intelligent gate arrangement 19 provided with the one-way gates 21 and the cow identification member 23 is, however, in this embodiment arranged between the resting area 1 and the milking area 5 for directing each of the cows leaving the resting area 1 and moving towards the milking area 5 into one of the sections 35, 36, 37, 38 depending on the group, to which the respective cow belongs, so that each of the sections 35, 36, 37, 38 will house cows belonging to one of the groups.

Each milking area section 35, 36, 37, 38 houses at least one milking box, in which a cow is present during milking, and the milking in the milking area 5 is performed by at least one milking robot (not explicitly illustrated). Preferably, at least some of the sections 35, 36, 37, 38 houses a plurality of milking robots or at least a plurality of milking boxes.

Each of the milking area sections 35, 36, 37, 38 leads directly to a respective one of the feeding area sections 41, 43, 45, 47 to keep the groups separated therein as well. After leaving the feeding area 3 the cows are mixed one with each other and have to walk through a common passage way 49 to arrive at the resting area 1.

Other details as disclosed with respect to the FIG. 1 embodiment are, mutatis mutandis, equally applicable to this embodiment.

Figure 3:
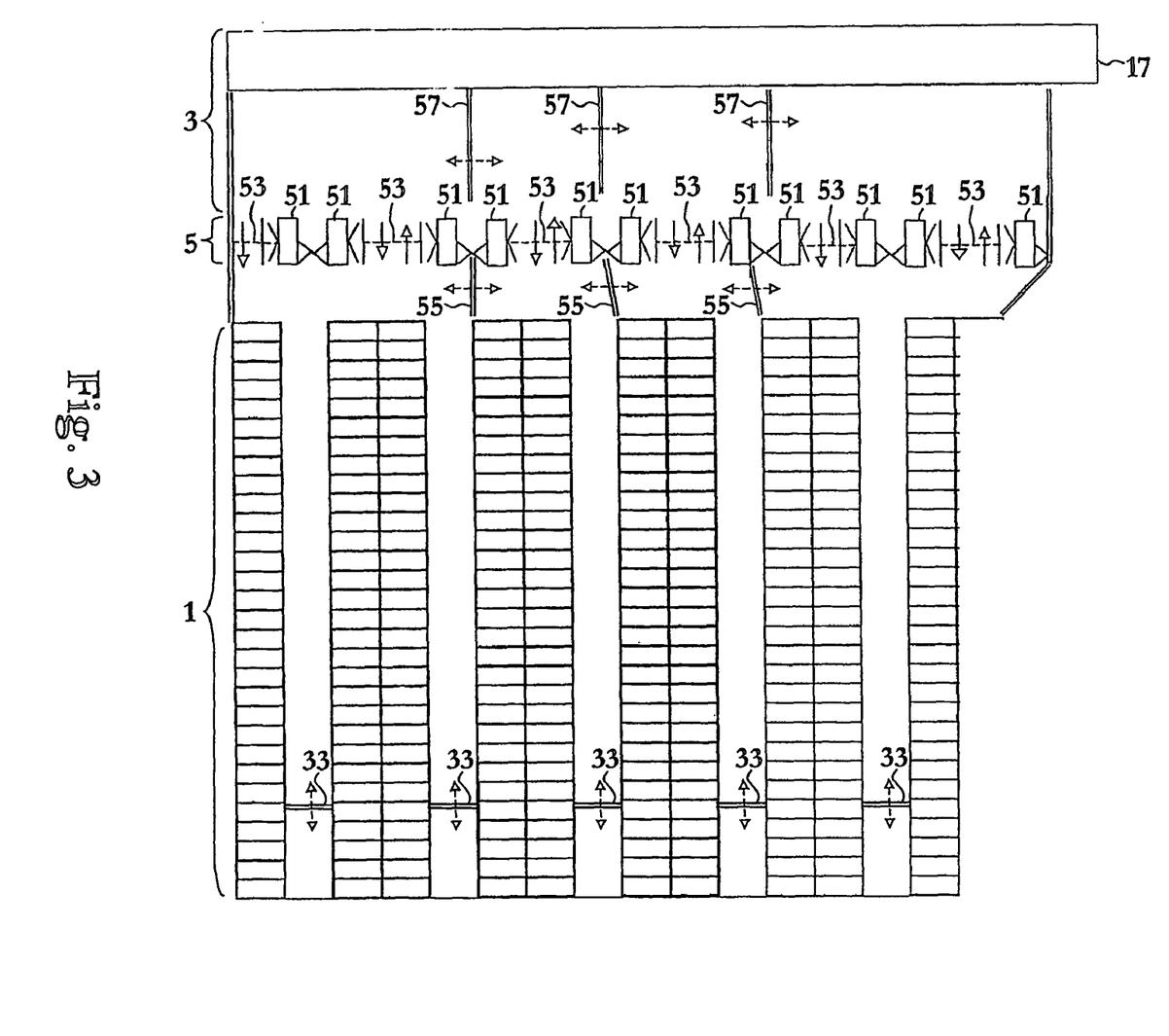

FIG. 3 illustrates a computer-controlled animal arrangement according to yet a further preferred embodiment of the invention. Here, each of the resting area 1, the milking area 5, and the feeding area are partitioned in sections so that each group of cows will be separated from the other groups at each location.

The milking area 5 houses a plurality of milking stations 51, each including a milking robot for milking the cows. Alternatively, each station houses only a milking box, in which a cow is present during milking, and a common milking robot performs the milking in a plurality of the station 51.

The cows can move from the resting area 1 to the feeding area 3 by means of passing through a milking station 51. Furthermore, a number of gates 53 are located in the milking area 5 for direct passage between the feeding 3 and resting 1 areas, each of which may be provided with a cow identification member. For one-way gates from the feeding area 3 to the resting area 1 no cow identification member is needed, but for two-way gates typically a cow identification member is needed at the resting area 1 side to only allow cows to pass through after having identified themselves as cows which have no permission to be milked.

The resting area 1 is partitioned in sections by means of computer-controlled movable partition devices 55, particularly movable fences, doors, gates, partition walls, wires or live wires, wherein each of the sections is adapted to house cows belonging to one of the plurality of groups. Further, the partition devices 55 link the resting area 1 sections to the milking area 5 so that cows housed in the respective resting area section have access to a subset only of the plurality of milking stations. In order to accommodate for changes in the number of cows housed in the respective resting area section or changes in the milking capacity required by the cows housed in the respective section the movable partition devices 55 can be moved to enlarge or reduce each of the respective subsets of the plurality of milking stations 51, to which the cows housed in the respective section have access.

Similarly, the feeding area 3 is partitioned in sections by means of computer-controlled movable partition devices 57, which may be arranged to enlarge or reduce the sizes of, and/or the feed supplies to, the feeding area sections.

The resting area 1 may comprise driving devices 33 as the one described with reference to FIG. 1 for forcing cows in the resting area sections towards the milking area 5 and the plurality of milking stations 51. Other enticing devices are preferably also provided.

It shall be appreciated that the cows may be allowed to move about freely in the feeding area 3 and in such an instance the movable partition devices 57 may be dispensed with.

However, to keep the partitioning of the groups of cows in the resting area 1 the arrangement has to include a device for directing each of the cows moving towards the resting area 1 into the correct section (depending on the group, to which the respective cow belongs).

Such device may be comprised of a device similar to the intelligent gate arrangement 19 as described with reference to the FIGS. 1-2 embodiments.

Alternatively, each of the gates 53, which can be accessed from the feeding area, is provided with a cow identification member identifying a cow approaching the gate from the feeding area side, and a cow identified is only allowed to pass through the gate if it belongs to the group of cows which are housed by the resting area section behind that gate.

Other details as disclosed with respect to the FIGS. 1-2 embodiments are, mutatis mutandis, equally applicable to this FIG. 3 embodiment.

It shall be appreciated that the milking robots, the two-way gates, the cow identification members, the computer-controlled door or gate opening devices, the intelligent gate arrangements, the movable partition devices, and the driving mechanisms are, in each animal arrangement, connected to a computer-based processing and control device (not explicitly illustrated), which is responsible for central processing and controlling of the respective animal arrangement, and comprises typically a microcomputer, suitable software, and a database including information of each of the cows in the housed by the arrangement, such as e.g. when the respective cow was milked last time, when she was fed last time, her milk production, her health, etc.

The invention claimed is:

1. A computer-controlled arrangement for housing a large number of milking animals, each of which animals belongs to one of a plurality of groups, said arrangement comprising:
   a resting area (1) wherein the animals are rested;
   a feeding area (3) wherein the animals are fed;
   a milking area (5) housing at least one milking robot for milking the animals, the milking area being located between the resting area and the feeding area such that the animals milked in the milking area move from the resting area to the feeding area,
   wherein at least one area of i) the resting area, and ii) the feeding area comprise plural partitions physically partitioning the one area into plural sections whose size may be automatically changed,
   wherein at least one of the partitions is a computer-controlled movable partition, located in a first section of the plural sections, for dynamically enlarging and reducing an area of the first section in which the animals may be present, the movable partition being movable, under computer control, in a first direction and a second direction, movement of the movable partition in the first direction enlarging the area of the first section in which the animals may be present, and movement of the movable partition in the second direction reducing the area of the first section in which the animals may be present; and
   a device (19, 53) comprising an animal identification device (23) to determine an animal identification of each animal presented to a gate arrangement, the device structured and arranged to automatically, based on the determined animal identification, direct each of the animals into one section, whose size may be automatically changed, of the plural sections corresponding to a group to which the animal belongs so that each of the plural sections house animals belonging to only one of the groups.

2. The arrangement of claim 1, wherein,
   the device (19, 53) is located between the feeding area and the resting area, and
   the device is an intelligent gate arrangement operative (19, 53) operative, based on the determined animal identification, to direct each of the animals into one of the plural sections corresponding to the group to which the animal belongs.

3. The arrangement of claim 2, wherein,
   the gate arrangement comprises plural intelligent gates (53) located within the milking area between the feeding area and the resting area.

4. The arrangement of claim 3, wherein,
   one of the animal identification devices is located at a resting area side of each of the intelligent gates, and
   the intelligent gates are operative, based on the determined animal identification indicating the animal has permission not to be milking, to direct the animal to moving into the feeding area.

5. The arrangement of claim 3, wherein,
   the one area is the resting area with the plural partitions physically partitioning the one resting area into plural resting sections,
   each partition is a partition device (55) located adjacent the milking area and physically partitioning the feeding area into the plural resting sections,
   at least partition device (55) is a computer-controlled movable partition device (55) located in the resting area between one resting section and another adjacent resting section,
   movement of the movable partition device (55) in the first direction enlarges an area of the one resting section, while correspondingly reducing an area of the adjoining other resting area, and
   movement of the movable partition device (55) in the second direction reduces the area of the one resting section while correspondingly enlarging the area of the adjacent other resting section.

6. The arrangement of claim 5, wherein,
   the feeding area comprises plural partitions (57) physically partitioning the feeding area into plural feeding sections,
   at least one of the plural partitions (57) of the feeding area is the computer-controlled movable partition device (57), movement of the movable partition device (57) enlarging or reducing an area of a first feeding section while correspondingly reducing or enlarging an area of an adjacent second feeding section,
   the movement of the movable partition device (57) in the first direction enlarges the area of the first feeding section while correspondingly reducing the area of the adjacent second feeding area, and
   movement of the movable partition device (57) in the second direction reduces the area of the first feeding section while correspondingly enlarging the area of the adjoining adjacent feeding section.

7. The arrangement of claim 3, wherein,
   the one area is the feeding area with the plural partitions (57) physically partitioning the one feeding area into plural feeding sections,
   the computer-controlled movable partition is a movable partition device (57), movement of the movable partition device (57) enlarging or reducing an area of a first feeding section while correspondingly reducing or enlarging an area of an adjacent second feeding section,
   the movement of the movable partition device (57) in the first direction enlarges the area of the first feeding section while correspondingly reducing the area of the adjacent second feeding area, and movement of the movable partition device (57) in the second direction reduces the area of the first feeding section while correspondingly enlarging the area of the adjoining adjacent feeding section.

8. The arrangement of claim 7, wherein,
the resting area comprises plural partition devices (55) located adjacent the milking area and physically partitioning the feeding area into the plural resting sections,
at least one of plural partition devices (55) is a computer-controlled movable feed partition device (55) located between one resting section and another adjacent resting section,
movement of the movable feed partition device (55) in the first direction enlarges an area of the one resting section, while correspondingly reducing an area of the adjacent other resting area,
movement of the movable feed partition device (55) in the second direction reduces the area of the one resting section while correspondingly enlarging the area of the adjacent other resting section, and
the intelligent gates are operative, based on the determined animal identification indicating the animal has permission not to be milking, to direct the animal to moving into the feeding area.

9. The arrangement of claim 2, wherein,
the one area is the resting area with the plural partitions physically partitioning the one resting area into plural resting sections,
the gate arrangement (19) is located between an exit of the feeding area and an entrance to the resting area, and
the intelligent gate arrangement is operative, based on the determined animal identification, to direct each of the animals moving towards an entrance of one of the plural resting sections (7, 9, 11, 13) corresponding to the group to which the animal belongs.

10. The arrangement of claim 1, wherein,
the one area is the resting area with the plural partitions physically partitioning the one resting area into plural resting sections,
each of the plural resting section including one of the computer-controlled movable partitions,
the computer-controlled movable partition is a driving device (33) located in each respective resting section,
movement of the driving device in the first direction enlarges the area of each respective resting section in which the animals may be present, and
movement of the driving device in the second direction reduces the area of each respective resting section in which the animals may be present forcing the animals present in each respective resting section towards the milking area.

11. The arrangement of claim 10, wherein,
the device (19, 53) is located between the feeding area and the resting area, and
the device is an intelligent gate arrangement (19, 53) operative, based on the determined animal identification, to direct each of the animals moving towards the resting area into one of the plural resting sections corresponding to the group to which the animal belongs.

12. The arrangement of claim 11, wherein,
the gate arrangement (19) is located between an exit of the feeding area and an entrance to the resting area, and
the intelligent gate arrangement is operative, based on the determined animal identification, to direct each of the animals moving towards an entrance of one of the plural resting sections (7, 9, 11, 13) corresponding to the group to which the animal belongs.

13. The arrangement of claim 11, wherein,
the gate arrangement comprises plural intelligent gates (53) located within the milking area between the feeding area and the resting area, and
the intelligent gates are operative, based on the determined animal identification, to direct each of the animals moving into one of the plural resting sections (7, 9, 11, 13) corresponding to the group to which the animal belongs.

14. The arrangement of claim 10, wherein,
the feeding area comprises plural partitions (57) physically partitioning the feeding area into plural feeding sections,
at least one of the plural partitions (57) of the feeding area is the computer-controlled movable partition device, movement of the movable partition device (57) enlarging or reducing an area of a first feeding section while correspondingly reducing or enlarging an area of an adjacent second feeding section,
the movement of the movable partition device (57) in the first direction enlarges the area of the first feeding section while correspondingly reducing the area of the adjacent second feeding area, and
movement of the movable partition device (57) in the second direction reduces the area of the first feeding section while correspondingly enlarging the area of the adjoining adjacent feeding section.

15. The arrangement of claim 14, wherein,
the resting area further comprises plural partition devices (55) located adjacent the milking area and physically partitioning the feeding area into the plural resting sections,
at least one of plural partition devices (55) is a computer-controlled movable partition device (55) located in the resting area between one resting section and another adjacent resting section,
movement of the movable partition device (55) in the first direction enlarges an area of the one resting section, while correspondingly reducing an area of the adjacent other resting area, and
movement of the movable partition device (55) in the second direction reduces the area of the one resting section while correspondingly enlarging the area of the adjacent other resting section.

16. The arrangement of claim 10, wherein,
the resting area further comprises plural partition devices (55) located adjacent the milking area and physically partitioning the feeding area into the plural resting sections,
at least one of plural partition devices (55) is a computer-controlled movable partition device (55) located in the resting area between one resting section and another adjacent resting section,
movement of the movable partition device (55) in the first direction enlarges an area of the one resting section, while correspondingly reducing an area of the adjacent other resting area, and
movement of the movable partition device (55) in the second direction reduces the area of the one resting section while correspondingly enlarging the area of the adjacent other resting section.

17. The arrangement of claim 1, wherein,
the one area is the feeding area with the plural partitions (57) physically partitioning the feeding area into plural feeding sections,
the computer-controlled movable partition is a computer-controlled movable partition device (57) located in the feeding area between a first feeding section and an adjacent second feeding section, movement of the movable partition device (57) in the first direction enlarges an area of the first feeding section, while correspondingly reducing an area of the adjacent second feeding area, and movement of the movable partition device (57) in the second direction reduces the area of the first feeding section while correspondingly enlarging the area of the adjacent second feeding section.

18. The arrangement of claim 1, wherein, the one area is the resting area with the plural partitions (55) physically partitioning the feeding area into plural feeding sections, the computer-controlled movable partition is a computer-controlled movable partition device (55) located in the resting area between a first resting section and an adjacent second resting section, movement of the movable partition device (55) in the first direction enlarges an area of the first resting section, while correspondingly reducing an area of the adjacent second resting area, and movement of the movable partition device (55) in the second direction reduces the area of the first resting section while correspondingly enlarging the area of the adjacent second resting section.

\* \* \* \* \*

UNITED STATES PATENT AND TRADEMARK OFFICE
CERTIFICATE OF CORRECTION

PATENT NO. : 8,402,919 B2  Page 1 of 1
APPLICATION NO. : 10/542294
DATED : March 26, 2013
INVENTOR(S) : Johansson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1388 days.

Signed and Sealed this
First Day of September, 2015

Michelle K. Lee
*Director of the United States Patent and Trademark Office*